(12) United States Patent
Epis et al.

(10) Patent No.: US 10,161,268 B2
(45) Date of Patent: Dec. 25, 2018

(54) SYSTEM, METHOD AND APPARATUS FOR MINIMIZING HEAT LOSS IN A HEAT RECOVERY STEAM GENERATOR

(71) Applicant: General Electric Technology GmbH, Baden (CH)

(72) Inventors: Glauco Epis, Sesto San Giovanni (IT); Luca Angelo Cinquegrani, Sesto San Giovanni (IT); Luca Rigoni, Sesto San Giovanni (IT)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 38 days.

(21) Appl. No.: 15/405,807

(22) Filed: Jan. 13, 2017

(65) Prior Publication Data

US 2017/0211425 A1 Jul. 27, 2017

(30) Foreign Application Priority Data

Jan. 27, 2016 (EP) .................................. 16425003

(51) Int. Cl.

| | |
|---|---|
| *F01K 13/00* | (2006.01) |
| *F01K 13/02* | (2006.01) |
| *F23L 13/02* | (2006.01) |
| *F01N 5/02* | (2006.01) |
| *F22B 1/18* | (2006.01) |
| *F22B 37/06* | (2006.01) |

(Continued)

(52) U.S. Cl.
CPC ............ *F01K 13/006* (2013.01); *F01K 13/02* (2013.01); *F01N 5/02* (2013.01); *F16K 7/00* (2013.01); *F22B 1/1815* (2013.01); *F22B 37/06* (2013.01); *F23L 13/02* (2013.01); *F01N 2260/08* (2013.01); *F01N 2260/10* (2013.01); *F01N 2590/10* (2013.01); *F02G 5/02* (2013.01); *Y02E 20/14* (2013.01); *Y02E 20/16* (2013.01); *Y02T 10/16* (2013.01)

(58) Field of Classification Search
CPC ..................................................... F01K 13/006
USPC ..................................... 126/294, 285 R, 292
See application file for complete search history.

(56) References Cited

U.S. PATENT DOCUMENTS

| | | | |
|---|---|---|---|
| 1,099,963 A | 6/1914 | Brewer | |
| 2,577,405 A * | 12/1951 | Cones | ....................... F16K 7/00 |
| | | | 110/163 |

(Continued)

FOREIGN PATENT DOCUMENTS

GB 856219 A 12/1960

OTHER PUBLICATIONS

European Search Report and Written Opinion dated Aug. 2, 2016 which was issued in connection with EP Patent Application No. 16425003.7 which was filed Jan. 27, 2016.

*Primary Examiner* — Avinash Savani
(74) *Attorney, Agent, or Firm* — GE Global Patent Operation; Stephen G. Midgley

(57) ABSTRACT

A damper assembly for minimizing heat loss through an exhaust stack includes a housing mountable within the stack and an umbrella received within the housing. The umbrella is selectively movable between a first position in which the umbrella is received within the housing, and second position in which the umbrella is extended from the housing such that a peripheral edge of the umbrella is in close association with an interior sidewall of the exhaust stack to minimize a flow of fluid past the umbrella and out of the stack.

19 Claims, 12 Drawing Sheets

(51) Int. Cl.
*F16K 7/00* (2006.01)
*F02G 5/02* (2006.01)

(56) References Cited

U.S. PATENT DOCUMENTS

| | | | |
|---|---|---|---|
| 3,181,451 A | | 5/1965 | Hess |
| 3,958,605 A | * | 5/1976 | Nishizu .................. F24F 11/047 |
| | | | 137/504 |
| 4,449,512 A | * | 5/1984 | Hebert .................... F23L 13/02 |
| | | | 126/285 R |

\* cited by examiner

SYSTEM, METHOD AND APPARATUS FOR MINIMIZING HEAT LOSS IN A HEAT RECOVERY STEAM GENERATOR

BACKGROUND

Technical Field

Embodiments of the invention relate generally to power generation and, more particularly, to an apparatus for mitigating heat loss through the stack of a heat recovery steam generator during outage periods.

Discussion of Art

Gas turbines have been widely used to provide electric power, usually as a standby for both peak power and reserve power requirements in the utility industry. Gas turbines are preferred because of their rapid starting capability and low capital cost. Conventional gas turbines, however, operate with reduced thermal efficiency due to the high exit temperatures of the exhaust gas stream and the resulting thermal loss. Therefore, a gas turbine is often combined with a heat recovery steam generator to improve overall system efficiency.

As is known in the art, heat recovery steam generators can be employed to drive a steam turbine for power output, such as in a combined cycle power plant, or to provide process steam in cogeneration cycles. For example, flue gas discharged by the gas turbine may be conducted through a heat recovery steam generator for the generation of steam and then discharged to atmosphere through a stack.

During outage periods of a power plant, such as during night or weekend shutdowns, heat may be lost from the heat recovery steam generator through the stack due to natural draft. This heat loss through the stack also results in a decrease in pressure within the boiler drums of the heat recovery steam generator that must be recovered during the following start up, which increases the fuel cost and the time required to bring the plant back online and operating at full capacity.

In addition to the increase in fuel cost and time required to transition the plant back to full capacity after a shut down, frequent shut down and start up can contribute to cyclical stresses in the components of the heat recovery steam generator. In particular, cyclical stresses may result from changes in the temperature of components as the plant is shut-down and re-started. Because of the high stream pressures involved, many of the components are thick-walled so the temperature changes do not occur evenly across the components. This results in differing rates of thermal expansion and contraction across the component and high material stresses.

Existing strategies to reduce thermal stresses during shut down and subsequent re-start include the use of metallic dampers within the stack that can be selectively closed during shutdown. Such dampers help to prevent heat loss from the heat recovery steam generator through the stack during shut down periods, thereby reducing the magnitude of temperature changes and thus thermal stresses within the components of the heat recovery steam generator, as well as decreasing the time required and amount of fuel needed to bring the plant back up to full capacity. Many building and safety codes, however, prevent such metallic stack dampers from being retrofit into existing heat recovery steam generator stacks due to the immense weight of such dampers. Indeed, retrofitting of such dampers may often require a complete redesign of the stack and/or foundations to accommodate the stack damper weight.

In view of the above, there is a need for system, method and apparatus for quickly and easily sealing off the stack of a heat recovery steam generator to avoid natural draft during shut down periods of a power plant, and which system and apparatus may be retrofit into existing heat recovery steam generator stacks without requiring significant modifications to the stack or foundation.

BRIEF DESCRIPTION

In an embodiment, a damper assembly for minimizing heat loss through an exhaust stack is provided. The damper assembly includes a housing mountable within the stack and an umbrella received within the housing. The umbrella is selectively movable between a first position in which the umbrella is received within the housing, and second position in which the umbrella is extended from the housing such that a peripheral edge of the umbrella is in close association with an interior sidewall of the exhaust stack to minimize a flow of fluid past the umbrella and out of the stack.

In another embodiment, a damper assembly for minimizing heat loss through a stack of a heat recovery steam generator is provided. The damper assembly includes a housing positioned concentrically within the stack and an umbrella movable between a first position in which the umbrella is received within the housing and a second position in which the umbrella is extended from the housing.

In yet another embodiment, a method for minimizing heat loss through an exhaust stack is provided. The method includes the steps of mounting a damper assembly within the exhaust stack, the damper assembly having a housing and an umbrella within the housing, upon entering a shutdown mode, opening the umbrella such that the umbrella extends across a passageway defined by the exhaust stack, and upon entering a restart mode, closing the umbrella to enable exhaust gas to pass by the damper assembly within the stack and exit the stack.

DRAWINGS

The present invention will be better understood from reading the following description of non-limiting embodiments, with reference to the attached drawings, wherein below:

DETAILED DESCRIPTION

Figure 1:
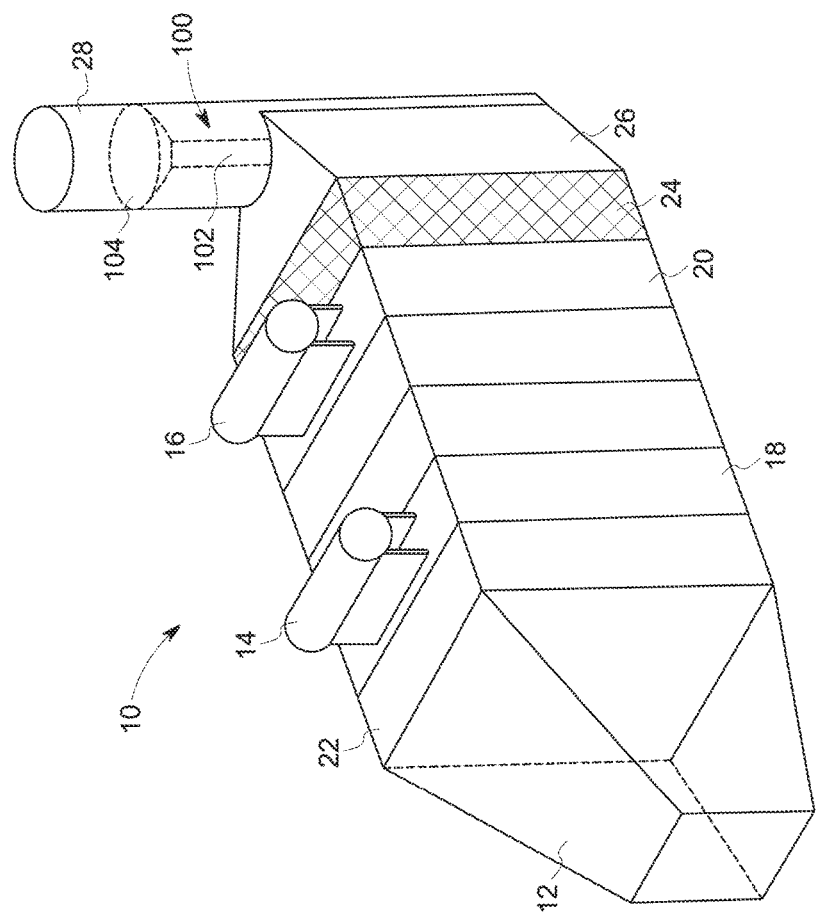
FIG. 1 is a schematic illustration of a heat recovery steam generator having a stack damper according to an embodiment of the invention.

Reference will be made below in detail to exemplary embodiments of the invention, examples of which are illustrated in the accompanying drawings. Wherever possible, the same reference characters used throughout the drawings refer to the same or like parts. While embodiments of the invention are suitable for use in the exhaust stack of a heat recovery steam generator of a combined cycle or cogeneration power plant, embodiments of the invention may also be applicable for use in other types of ducts in such power plants, such as in a heat recovery steam generator bypass duct, and in ducts, generally. For example, embodiments of the invention may also be suitable for use in any duct in which selective closing off and opening of the duct is desired to constrain or facilitate the flow of a gaseous or liquid fluid therethrough.

As used herein, "electrical communication" or "electrically coupled" means that certain components are configured to communicate with one another through direct or indirect signaling by way of direct or indirect electrical connections. As used herein, "operatively coupled" refers to a connection, which may be direct or indirect. The connection is not necessarily a mechanical attachment. As used herein, "communication" means that two or more components are connected in such a manner to allow for the propagation of signals between such components, such as, but not limited to, through wires/cables, fiber optics, and wireless transmitters/receivers.

Embodiments of the invention relate to a system, method and apparatus for minimizing heat loss from a heat recovery steam generator during shut down periods. FIG. 1 illustrates an exemplary heat recovery steam generator ("HRSG") 10 in which the system and apparatus of the invention may be deployed. The HRSG 10 has an inlet plenum 12 which is supplied with combustion gas from an exhaust duct of a gas turbine (not shown) which powers a generator (not shown). HRSG 10 is of known design and includes, for example, a high pressure drum 14, a low pressure drum 16, and associated heat exchanger surfaces including high and low pressure evaporators 18, 20, respectively, superheater 22, and economizer 24 surfaces in a conventional manner. After passing through the heat exchangers, the exhaust gases are directed through a transition piece 26 and are emitted to atmosphere via stack 28, as is known in the art. Other configurations of the HRSG are also possible.

Figure 2:
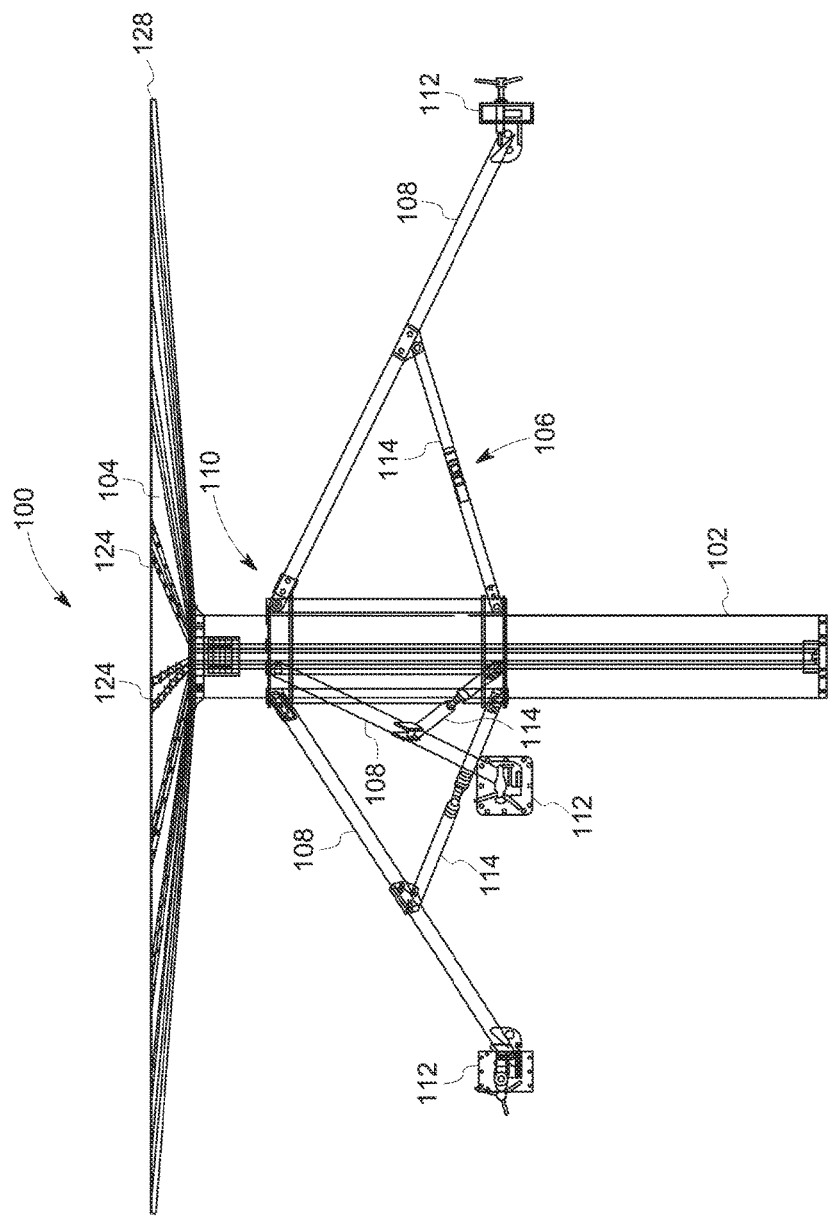
FIG. 2 is a side elevational view of the stack damper according to an embodiment of the present invention.
Figure 3:
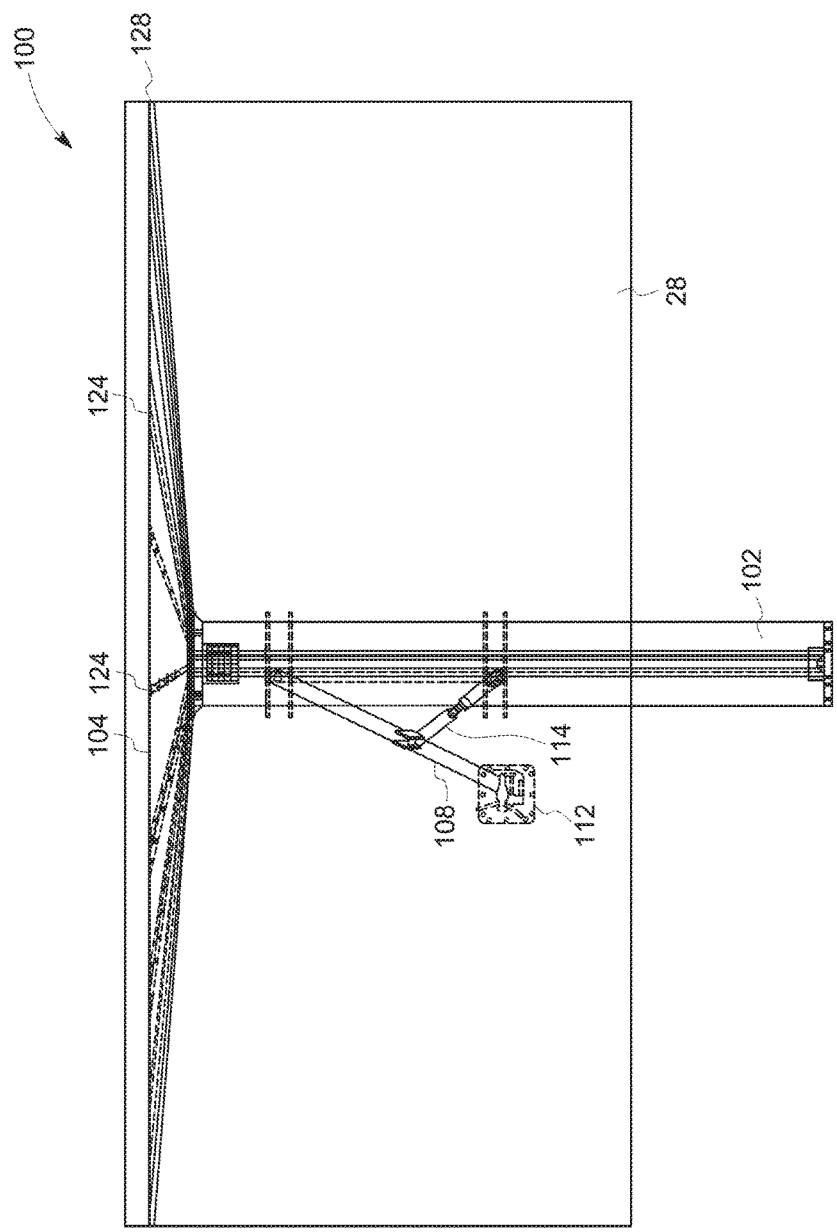
FIG. 3 is a side elevational view of the stack damper of FIG. 2, shown deployed in the stack of a heat recovery steam generator.

As further illustrated in FIG. 1, in accordance with an embodiment of the invention, a damper assembly 100 is mounted within the stack 28 and is operable to selectively close off the stack 28 to minimize heat loss from the HRSG 10 during shut down periods, as discussed in detail hereinafter. Referring now to FIGS. 2 and 3, the damper assembly 100 includes a generally cylindrical conduit or housing 102 configured to receive an umbrella 104 therein. The conduit 102 is positioned generally concentrically within the stack 28 and is supported therein by a tripod-like mounting assembly 106. As shown in FIG. 2, the mounting assembly 106 includes a plurality of supporting legs 108 pivotally connected at one end to the conduit 102 via a generally cylindrical frame 110 surrounding the conduit 102, and at their respective opposite ends to the inner walls of the stack 28 via mounting brackets 112. The assembly 106 also includes a plurality of struts 114 associated with each leg 108. The struts 114 include an adjustment mechanism which allows the length of the struts 114 to be adjusted.

Figure 4:
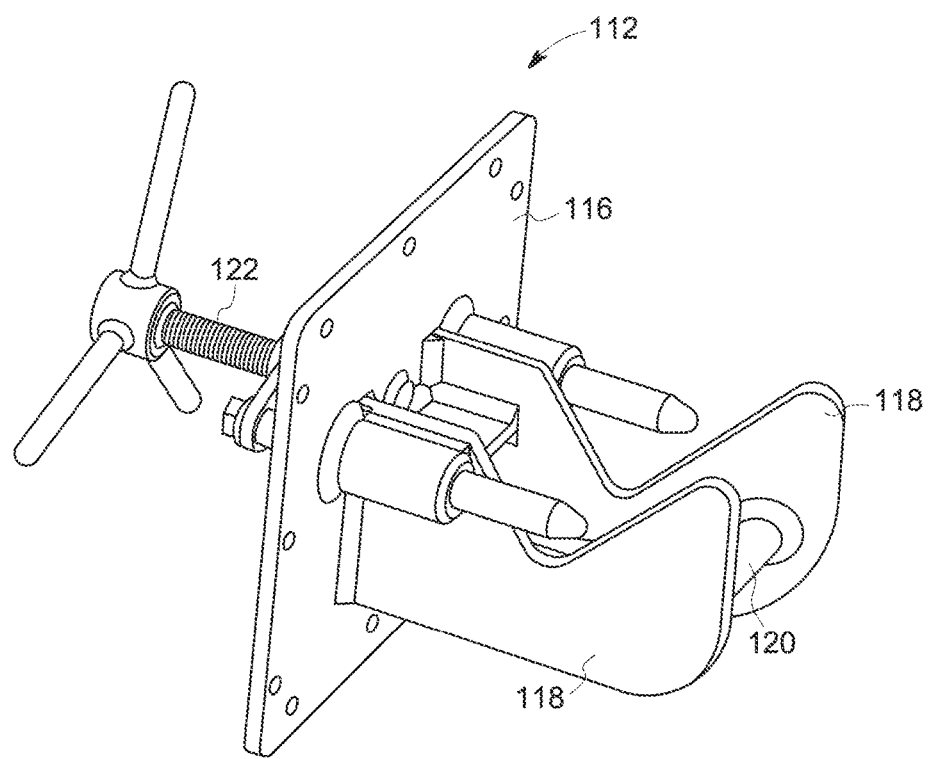
FIG. 4 is a perspective view of a mounting bracket of the stack damper of FIG. 2.
Figure 5:
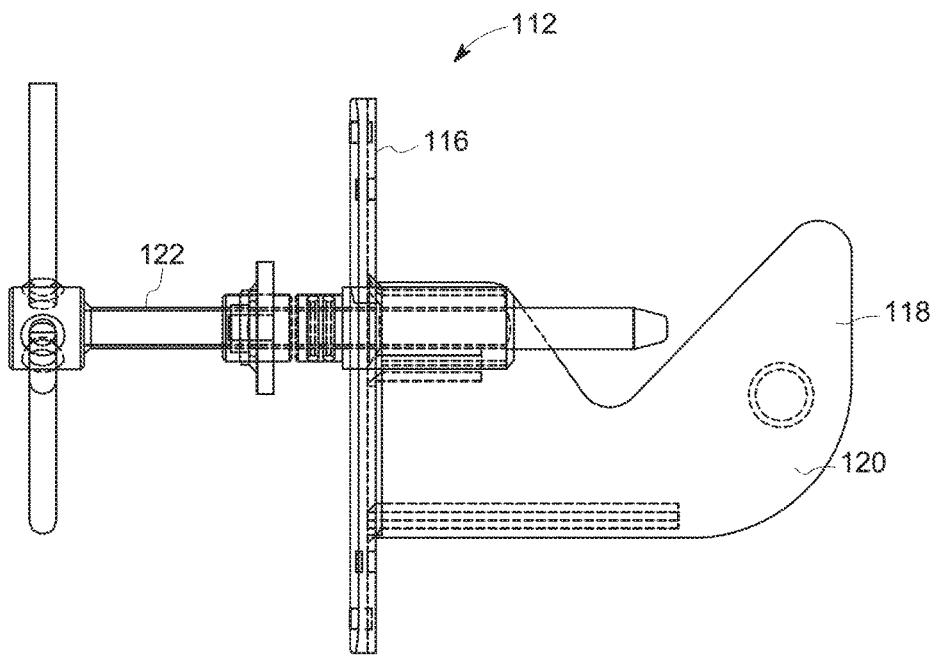
FIG. 5 is a side elevational view of the mounting bracket of FIG. 4.
Figure 6:
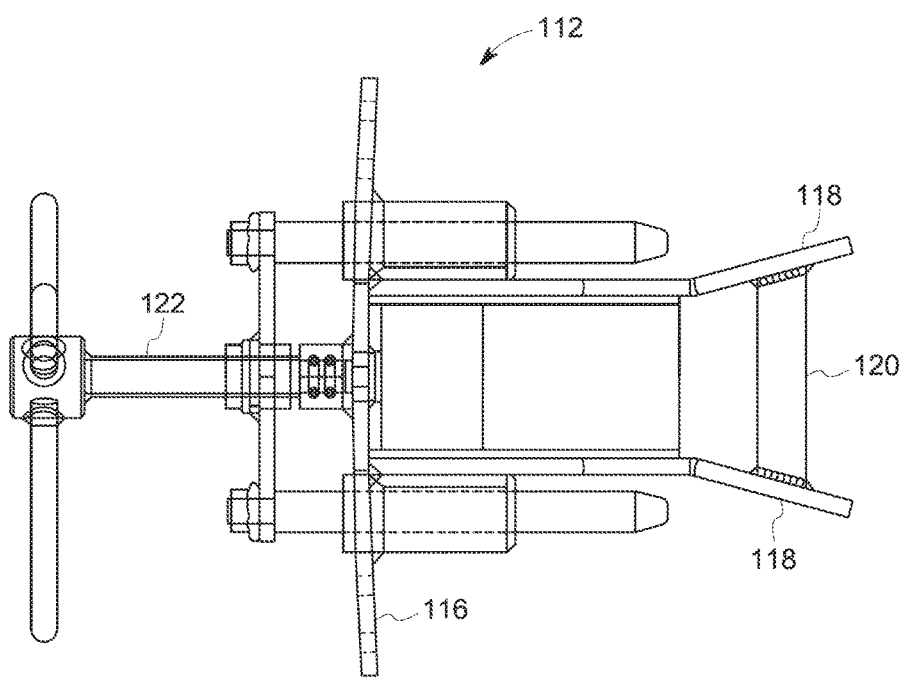
FIG. 6 is a top plan view of the mounting bracket of FIG. 4.

FIGS. 4-6 illustrated an exemplary configuration of the mounting brackets 112 which enable mounting of the damper assembly 100 to the interior sidewalls of the stack 28, as discussed hereinafter. As shown therein, the mounting brackets 112 include a generally planar base plate 116 from which a pair of opposed tines 118 extend. The tines 118 are joined by a rod 120. The rod 120 is designed so as to be received by a hook portion formed on the end of the legs 108 to enable coupling of the legs 108 to a respective mounting bracket 112. A tightening screw 122 is provided on an opposing side of the base plate 116 which enables the mounting bracket 112 to be fixedly secured to the stack 28.

With the umbrella 104 in its retracted state, housed within conduit housing 102, the damper assembly 100 may be installed within the stack 28 utilizing the mounting assembly 106. In particular, the damper assembly 100 may be lowered into the stack 28 and secured to the sidewalls of the stack utilizing the mounting brackets 112. The pivoting configuration of the legs 108, in combination with the adjustable struts 114, allows the legs 108 to be pivoted upwardly or downwardly until the base plate 116 of each mounting bracket 112 contacts the interior sidewalls of the stack 28, at which point the tightening screw 122 may be utilized to fixedly secure the mounting bracket 112 to the sidewall. This provides for a rigid connection between the conduit 102 and the sidewalls of the stack 28, while the struts 114 provide bolstering support for the legs 108 and help bear the weight of the assembly 100.

With further reference to FIG. 3, the size and shape of the umbrella canopy, in its extended position, corresponds to the size and shape of the passageway defined by the inner walls of the stack 28 of the HRSG 10. In an embodiment, the umbrella is expandable into a generally circular shape, when viewed from above, and a slightly cone shape, as viewed from the side, as illustrated in FIGS. 2, 3 and 6. In any event, the diameter of the umbrella 104, when extended/opened, closely matches the inside diameter of the stack 28 or other passageway in which the damper assembly 100 is deployed. In an embodiment, the umbrella 104 is manufactured from a water-resistant fabric material capable of withstanding temperatures in excess of approximately 250° C. For example, in an embodiment, the umbrella canopy may be formed from fiberglass with a double protective layer (i.e., on its internal and external surface) of silicon, and Kevlar® stitching. In an embodiment, the total surface area of the canopy material is approximately 38 square meters. In an embodiment, the umbrella 104 is configured to be deployed approximately 4 inches from the top of the stack 28.

Figure 7:
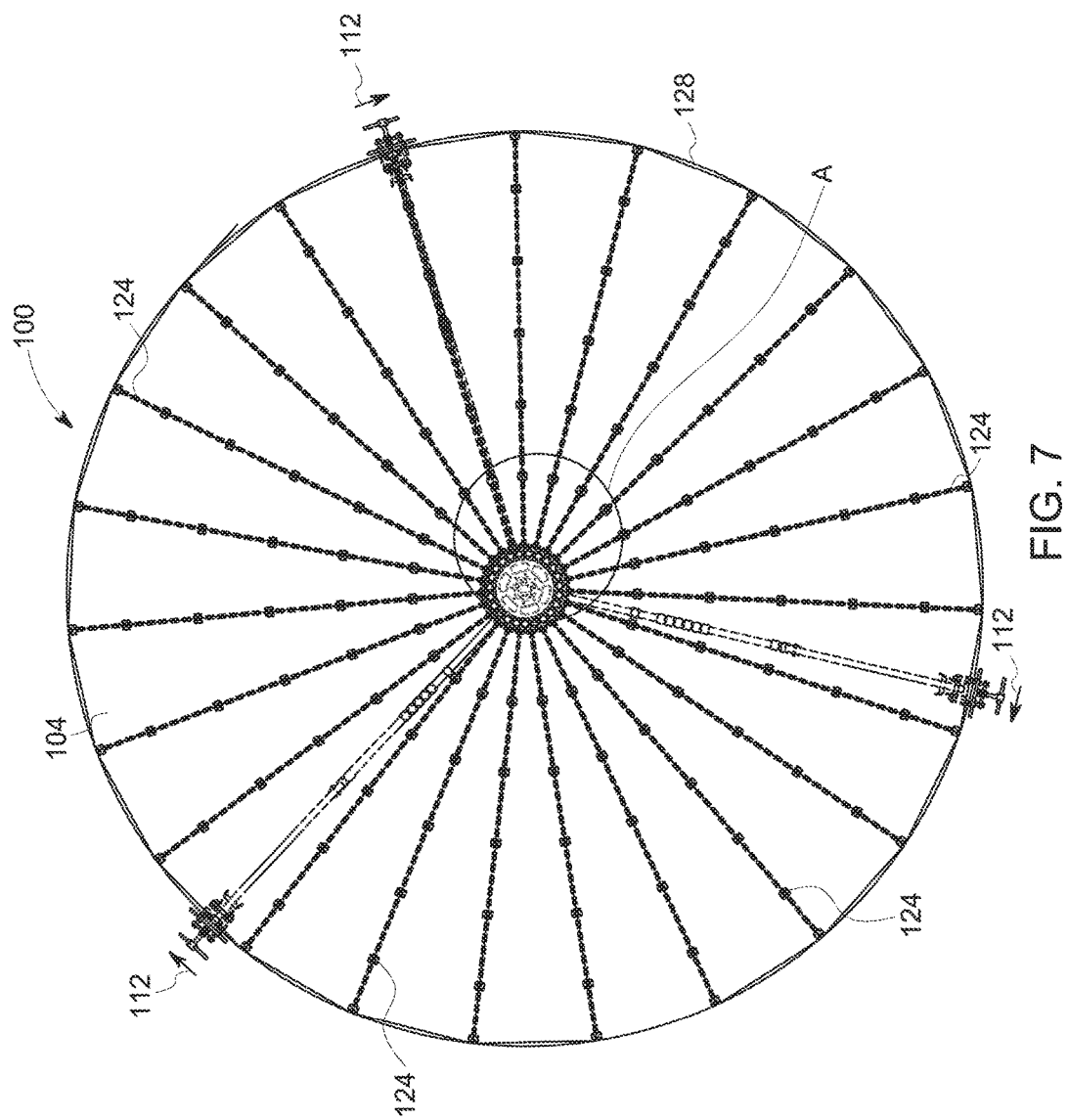
FIG. 7 is a top plan view of the the stack damper of FIG. 2, shown a deployed position.
Figure 8:
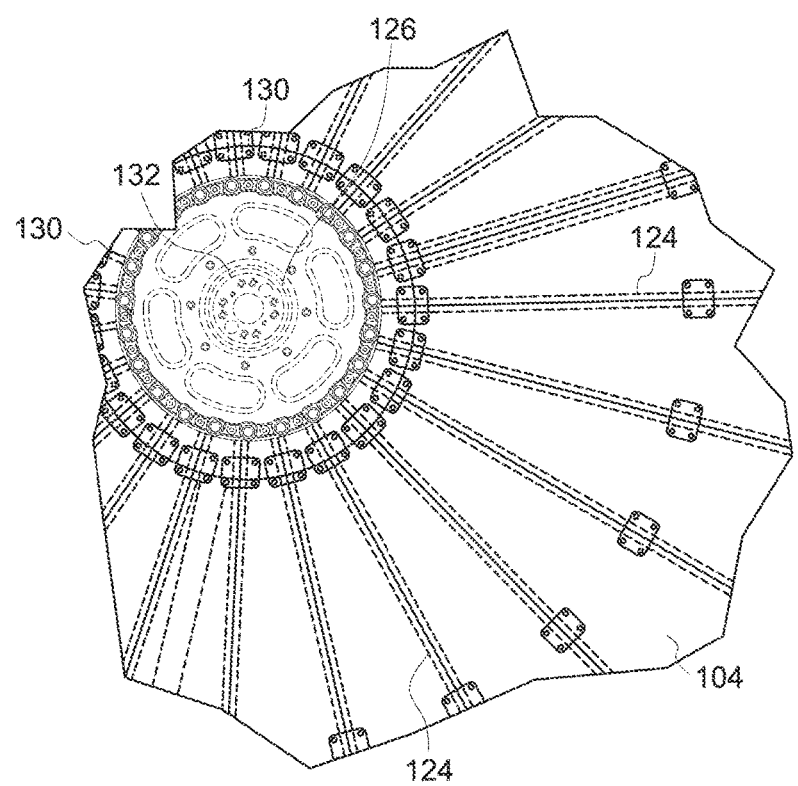
FIG. 8 is enlarged view of area A of FIG. 7.
Figure 9:
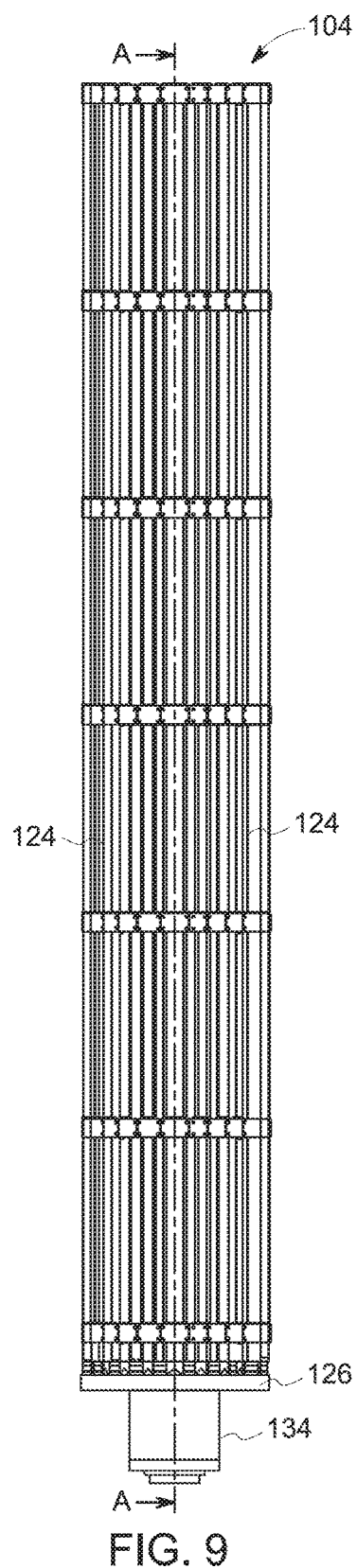
FIG. 9 is a side elevational view of an umbrella of the stack damper of FIG. 2, shown in a retracted position.

Turning now to FIGS. 7-13, additional views of the damper assembly 100 are illustrated. As best shown in FIGS. 7 and 9, the umbrella 104 has a plurality of metallic ribs 124 pivotally connected to a base 126. The metallic ribs 124 are configured to provide support for the canopy material and function to selectively open and close the umbrella 104, as discussed in detail hereinafter. As shown in FIG. 7, in the open or extended position, the ribs 124 extend radially outward from the base 126 to a peripheral edge 128 of the umbrella in contact or in close association with the interior sidewalls of the stack 28. In the closed or retracted position, as shown in FIG. 9, the ribs 124 extend substantially vertically so that the umbrella 104 may be slidably received within its conduit housing 102.

Although the ribs 124 are described herein as being manufactured from a metallic material, other materials exhibiting sufficient rigidity to bear the weight of the umbrella during twice per day deployment may also be utilized without departing from the broader aspects of the present invention. As will be appreciated, the number of ribs 124 may vary depending on criteria such as, for example, the diameter of the umbrella 104.

Figure 12:
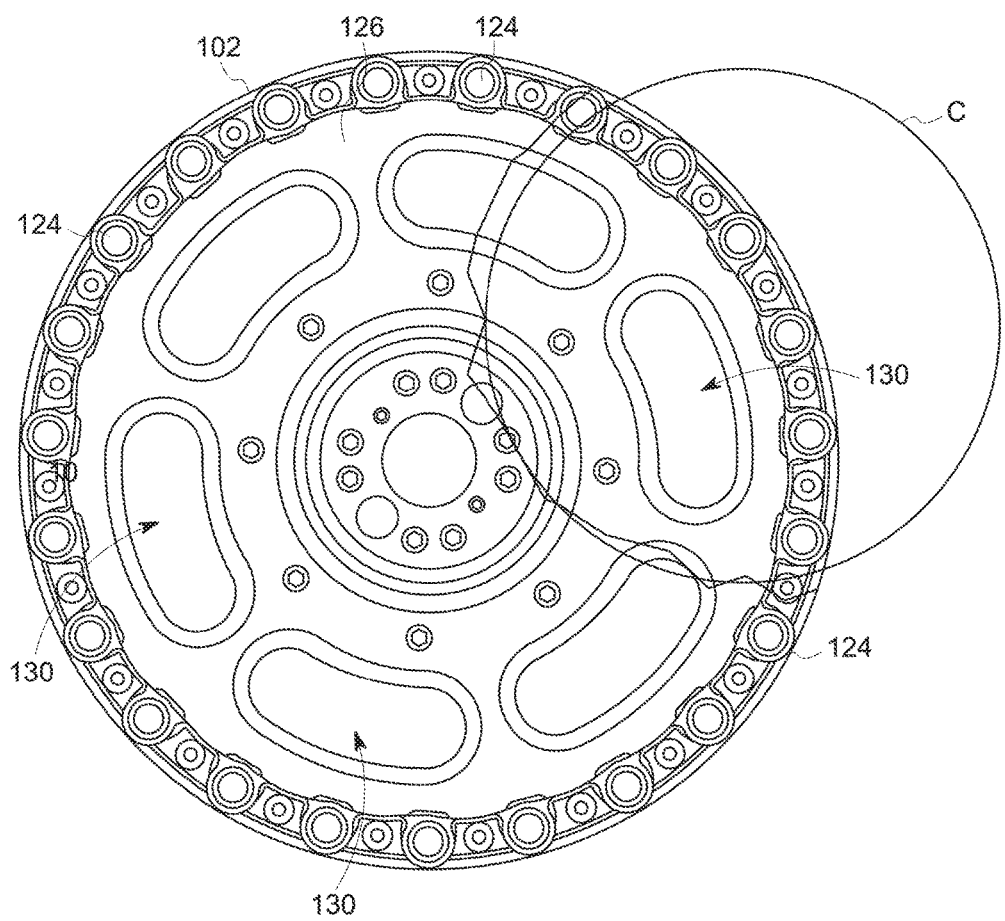
FIG. 12 is a top plan view of the stack damper of FIG. 2, shown in the retracted position.
Figure 13:
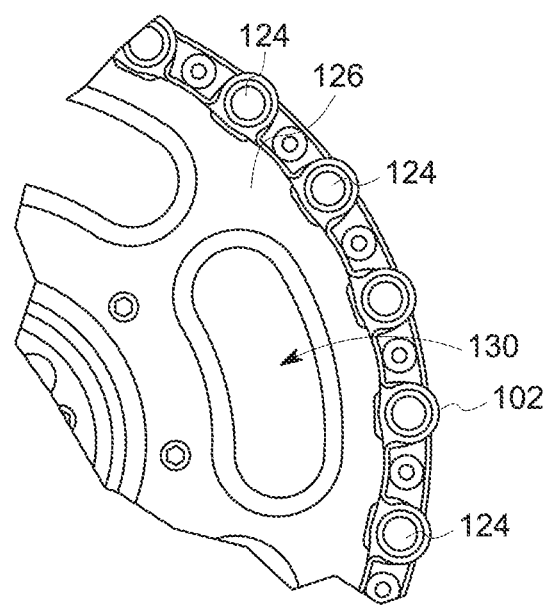
FIG. 13 is an enlarged view of area C of FIG. 12.

As best shown in FIGS. 8, 12 and 13, the base plate 126 is provided with a plurality of apertures 130 therein that allow rainwater or the like to pass through the umbrella 104, through the conduit housing 102, and into the stack 28 in order to prevent the accumulation of water on top of the umbrella 104. As also shown in FIG. 8, in an embodiment, the base 126 includes a hinge constraint 132 that limits the degree of opening and closing (i.e., pivoting) of the ribs 124.

Figure 10:
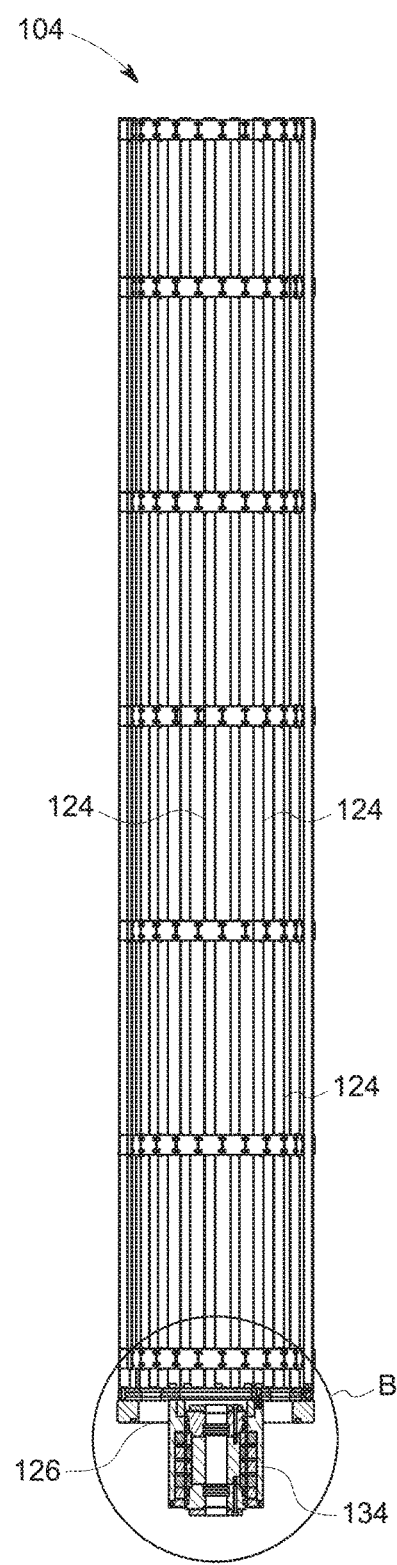
FIG. 10 is a cross-sectional view of the umbrella, taken along line A-A of FIG. 9.
Figure 11:
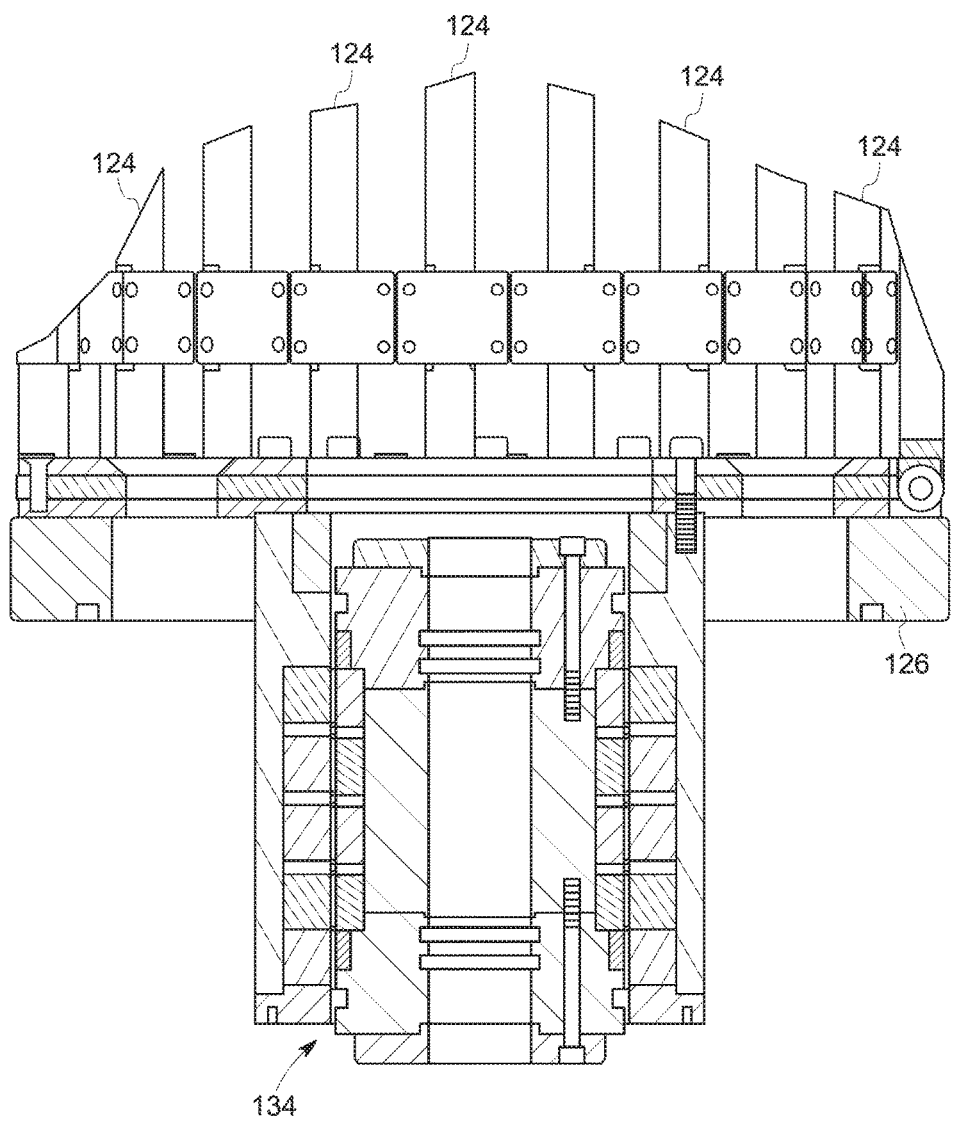
FIG. 11 is an enlarged, detail view of area B of FIG. 10.

As depicted in FIGS. 9, 10 and 11, the base plate 126 may include a magnetic slider cylinder 134 that may be utilized in conjunction with an electrical or pneumatic actuator to selectively retract or extend the umbrella 104. The actuator may take any form and operator according to principles generally known in the art.

In operation, after a shut down operation is commenced, the electric or pneumatic actuator may be actuated to selectively extend the umbrella 104 from its conduit housing 102. In particular, upon actuation of the actuator, the base 126 and umbrella 104 is pushed upwardly and out of the conduit 102. As the base 126 extends above the top rim of the conduit 102, the ribs 124 pivot outwardly, thereby opening the umbrella canopy in a manner similar to how a standard umbrella operates. In the fully open or extended position, shown in FIGS. 2 and 3, the umbrella 104 extends substantially across the passageway defined by the stack 28, blocking or inhibiting the passage of gas therethrough. In particular, in the extended position, heat loss from the HRSG through the stack 28 due to natural draft (as well as cold air entry into the stack 28) during boiler outage is minimized. Accordingly, during restart, the internal components of the HRSG may be at or close to normal operating temperatures, obviating the need to slowly preheat the HRSG prior to operating at fully capacity. In addition, because the temperature within the HRSG is substantially maintained, even during outages, thermal stresses in the components of the HRSG may be minimized.

In connection with the above, upon restart, actuator may be actuated once again such that the base 126 is withdrawn downwardly into the conduit housing 102. As the base 126 is retracted, the ribs 124 pivot inwardly, causing the umbrella 104 to fold upon itself to the position shown in FIG. 9 (at which point the umbrella 104 is substantially entirely received within the housing 102). In this position, the passageway defined by the stack 28 is generally clear (aside for the space taken up by the vertically-extending conduit 102) which allows exhaust gases to once again exit to atmosphere. Power generation, including operation of the HRSG, may then resume as usual.

In contrast to existing metallic dampers, the damper assembly 100 of the present invention is lightweight and can therefore be easily retrofit into existing HRSG stacks without requiring stack or foundation modification or redesign. In addition, once installed, the damper assembly 100 requires no subsequent assembly, disassembly or maintenance, but can simply be extended and retracted as desired in response to plant operating modes (i.e., shut down/outage and normal operation). This is in contrast to some existing devices which require installation before each outage or maintenance period, and removal from the stack before every subsequent restart. Furthermore, because the umbrella 104 is capable of withstanding temperatures up to and/or in excess of 250° C., the damper may be deployed within a normal cycling mode of the boiler where temperatures may approach 250° C. This is in contrast to existing devices which are not capable of deployment at such temperatures and may only be used in locations or in situations where the environment surrounding such devices has cooled to a substantial degree (e.g., below 100° C.), such as well after a shut down event (e.g., for maintenance).

As discussed above, the umbrella 104 may include openings or ports that allow rain water or the like to be discharged inside the stack or collected and removed from the stack with dedicated openings. In an embodiment, the pneumatic or electrical actuator may be electrically connected to a control unit such that the umbrella may be selectively extended and retracted automatically upon command by a user or technician. For example, the system may be configured such that it may be deployed or retracted upon depression of a button or the like by a technician. In another embodiment, the control unit may be configured to automatically extend the umbrella to create a fluid seal when a shut down mode is initiated, and to automatically retract the umbrella into the conduit housing when a restart mode is initiated, without specific input by a technician.

The present invention therefore prevents thermal losses through the stack where existing dampers cannot be installed because of structural loading reasons or utilized daily because of cycling operation. Accordingly, the damper assembly of the present invention obviates the need to burn a substantial amount of fuel to get the HRSG back up to temperature, thereby resulting in reduced operating costs, and decreases the time required to have the plant back at full capacity following an outage, such as a night shut down or weekend shut down, thereby increasing the efficiency of power generation, as a whole.

In an embodiment, a damper assembly for minimizing heat loss through an exhaust stack is provided. The damper assembly includes a housing mountable within the stack and an umbrella received within the housing. The umbrella is selectively movable between a first position in which the umbrella is received within the housing, and second position in which the umbrella is extended from the housing such that a peripheral edge of the umbrella is in close association with an interior sidewall of the exhaust stack to minimize a flow of fluid past the umbrella and out of the stack. In an embodiment, the umbrella includes a base, a plurality of ribs pivotally connected to the base, and a canopy supported by the ribs. In the first position the ribs are oriented substantially vertically, and in the second position the ribs extend generally radially outward from the base. In an embodiment, the damper assembly may include an actuator operatively connected to the base, the actuator being configured to selectively move the umbrella between the first position and the second position. In an embodiment, the base is slidable vertically within the housing. In an embodiment, the actuator is one of an electrical actuator and a pneumatic actuator. In an embodiment, the base has a plurality of apertures formed therein for the passage of water therethrough. In an embodiment, the umbrella has a generally circular shape when in the second position when viewed from above. In an embodiment, the housing is mounted concentrically within the stack. In an embodiment, the damper assembly may also include a mounting assembly for mounting the housing within the stack, the mounting assembly including a plurality of supporting legs pivotally connected at one end to the housing and at respective opposite ends to the interior sidewall of the stack via a mounting bracket, and an adjustable strut extending from the housing to each supporting leg. In an embodiment, the exhaust stack forms a part of a heat recovery steam generator. In an embodiment, the canopy is formed from a material configured to withstand temperatures up to approximately 250° C.

In another embodiment, a damper assembly for minimizing heat loss through a stack of a heat recovery steam generator is provided. The damper assembly includes a housing positioned concentrically within the stack and an umbrella movable between a first position in which the umbrella is received within the housing and a second position in which the umbrella is extended from the housing. In an embodiment, when in the second position, the umbrella extends radially outwardly from the housing such that a peripheral edge of the umbrella is in close association with an interior sidewall of the stack to inhibit a flow of air from the stack, and, when in the first position, the umbrella is stowed within the housing such that the flow of air is permitted to flow past the housing and exit the stack. In an embodiment, the umbrella includes a base, a plurality of ribs pivotally connected to the base, and a canopy supported by the ribs. In the first position the ribs are oriented substantially vertically, and in the second position the ribs extend generally radially outward from the base. In an embodiment, the damper assembly may include an actuator operatively connected to the base. The actuator is configured to selectively move the umbrella between the first position and the second position. In an embodiment, the stack is an exhaust stack at an outlet end of the heat recovery steam generator. In an embodiment, the stack is a bypass stack at an inlet end of the heat recovery steam generator.

In yet another embodiment, a method for minimizing heat loss through an exhaust stack is provided. The method includes the steps of mounting a damper assembly within the exhaust stack, the damper assembly having a housing and an umbrella within the housing, upon entering a shutdown mode, opening the umbrella such that the umbrella extends across a passageway defined by the exhaust stack, and upon entering a restart mode, closing the umbrella to enable exhaust gas to pass by the damper assembly within the stack and exit the stack. In an embodiment, the damper assembly is configured to remain in position within the stack during both the shutdown mode and the restart mode.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. § 122, sixth paragraph, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described system, method, and apparatus without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A damper assembly for minimizing heat loss through an exhaust stack, comprising:
   a housing mountable within the stack; and
   an umbrella received within the housing, the umbrella including a base, a plurality of ribs pivotally connected to the base, and a canopy supported by the ribs;
   wherein the umbrella is selectively movable between a first position in which the umbrella is received within the housing, and second position in which the umbrella is extended from the housing such that a peripheral edge of the umbrella is in close association with an interior sidewall of the exhaust stack to minimize a flow of fluid past the umbrella and out of the stack.

2. The damper assembly of claim 1, wherein:
   in the first position, the ribs are oriented substantially vertically; and
   wherein in the second position, the ribs extend generally radially outward from the base.

3. The damper assembly of claim 1, further comprising:
   an actuator operatively connected to the base, the actuator being configured to selectively move the umbrella between the first position and the second position.

4. The damper assembly of claim 1, wherein:
   the base is slidable vertically within the housing.

5. The damper assembly of claim 3, wherein:
   the actuator is one of an electrical actuator and a pneumatic actuator.

6. The damper assembly of claim 1, wherein:
   the base has a plurality of apertures formed therein for the passage of water therethrough.

7. The damper assembly of claim 1, wherein:
the umbrella has a generally circular shape when in the second position when viewed from above.

8. The damper assembly of claim 1, wherein:
the housing is mounted concentrically within the stack.

9. The damper assembly of claim 1, further comprising:
a mounting assembly for mounting the housing within the stack, the mounting assembly including a plurality of supporting legs pivotally connected at one end to the housing and at respective opposite ends to the interior sidewall of the stack via a mounting bracket, and an adjustable strut extending from the housing to each supporting leg.

10. The damper assembly of claim 1, wherein:
the exhaust stack forms a part of a heat recovery steam generator.

11. The damper assembly of claim 1, wherein:
the canopy is formed from a material configured to withstand temperatures up to approximately 250° C.

12. A damper assembly for minimizing heat loss through a stack of a heat recovery steam generator, the damper assembly comprising:
a housing positioned concentrically within the stack; and
an umbrella including a base, a plurality of ribs pivotally connected to the base, and a canopy supported by the ribs, the umbrella movable between a first position in which the umbrella is received within the housing and a second position in which the umbrella is extended from the housing.

13. The damper assembly of claim 12, wherein:
when in the second position, the umbrella extends radially outwardly from the housing such that a peripheral edge of the umbrella is in close association with an interior sidewall of the stack to inhibit a flow of air from the stack; and
when in the first position, the umbrella is stowed within the housing such that the flow of air is permitted to flow past the housing and exit the stack.

14. The damper assembly of claim 2, wherein:
in the first position the ribs are oriented substantially vertically; and
wherein in the second position the ribs extend generally radially outward from the base.

15. The damper assembly of claim 12, further comprising:
an actuator operatively connected to the base, the actuator being configured to selectively move the umbrella between the first position and the second position.

16. The damper assembly of claim 12, wherein:
the stack is an exhaust stack at an outlet end of the heat recovery steam generator.

17. The damper assembly of claim 12, wherein:
the stack is a bypass stack at an inlet end of the heat recovery steam generator.

18. A method for minimizing heat loss through an exhaust stack, comprising the steps of:
mounting a damper assembly within the exhaust stack, the damper assembly having a housing and an umbrella within the housing;
upon entering a shutdown mode, opening the umbrella such that the umbrella extends across a passageway defined by the exhaust stack;
upon entering a restart mode, closing the umbrella to enable exhaust gas to pass by the damper assembly within the stack and exit the stack; and
wherein the damper assembly is configured to remain in position within the stack during both the shutdown mode and the restart mode.

19. The method according to claim 18, wherein:
the umbrella includes a base, a plurality of ribs pivotally connected to the base, and a canopy supported by the ribs.

* * * * *